(12) United States Patent
Hofmann et al.

(10) Patent No.: US 7,726,216 B2
(45) Date of Patent: Jun. 1, 2010

(54) STRUCTURAL COMPONENT, IN PARTICULAR A LUBRICATING COMPONENT

(75) Inventors: Dieter Hofmann, Wilhermsdorf (DE); Markus Lang, Neumarkt (DE)

(73) Assignee: ElringKlinger AG, Dettingen/Erms (DE)

( * ) Notice: Subject to any disclaimer, the term of this patent is extended or adjusted under 35 U.S.C. 154(b) by 1244 days.

(21) Appl. No.: 11/131,326

(22) Filed: May 18, 2005

(65) Prior Publication Data

US 2006/0277864 A1    Dec. 14, 2006

(30) Foreign Application Priority Data

Feb. 11, 2005   (DE) ................. 10 2005 006 577

(51) Int. Cl.
*F16H 57/02*   (2006.01)
(52) U.S. Cl. ................................. 74/606 R
(58) Field of Classification Search ............... 74/606 R; 60/322, 323
See application file for complete search history.

(56) References Cited

U.S. PATENT DOCUMENTS

| 5,146,748 A | * | 9/1992 | Okada ................. 60/454 |
|---|---|---|---|
| 6,702,062 B2 | * | 3/2004 | Kusabiraki et al. .......... 181/240 |
| 6,797,402 B2 | * | 9/2004 | Chen et al. ................. 428/595 |
| 7,162,868 B2 | * | 1/2007 | Funakoshi ................... 60/323 |
| 7,273,129 B2 | * | 9/2007 | Harwood .................... 181/256 |
| 7,401,463 B2 | * | 7/2008 | Tsuruta ....................... 60/320 |

* cited by examiner

*Primary Examiner*—Vicky A Johnson
(74) *Attorney, Agent, or Firm*—Roylance, Abrams, Berdo & Goodman, L.L.P.

(57) ABSTRACT

A structural component, especially a shielding component, has structural parts (10, 12, 14, 16, 18) at least in part differently configured with respect to their surface extent and/or the directional pattern. At least one structural part (10) of a first type is provided with a curvature and with a longitudinal orientation. Structural parts (12) of a second type at least in part follow that curvature. Since the structural part (10) of the first type is designed as a shell and since the structural parts (12) of the second type are combined in pairs into groups (20, 22) and extend transversely to the longitudinal orientation of the structural part (10) of the first type, the edge area is strengthened by an additional structural part. The additional structural part is an integral component of the shielding body and does not need mounting-bracket parts positioned on the edge side.

11 Claims, 2 Drawing Sheets

STRUCTURAL COMPONENT, IN PARTICULAR A LUBRICATING COMPONENT

FIELD OF THE INVENTION

The present invention relates to a structural component, especially a shielding component, with structural parts at least in part differently configured with respect to their surface extent and/or the directional pattern. At least one structural part of a first type is provided with a curvature and with a longitudinal orientation. Structural parts of a second type at least in part follow the pertinent curvature.

BACKGROUND OF THE INVENTION

While heat development, for example, of a high-economy, performance-optimized diesel engine, can be very low on the cylinder crankshaft housing, this low heat development in no way applies to "hot zones" such as in manifolds, turbochargers, catalytic converters, etc. Due to the more and more compact construction of engines, components not thermally "compatible" are increasingly being in close proximity to one another. Accordingly, it is necessary to protect thermal engine components against bordering, heat-sensitive assemblies, such as sensors, fuel lines, pressure cells, body parts, etc. using so-called shielding components, such as heat shields. The situation is also exacerbated by the compact structure in that the high packing density of the assemblies constricts the cooling air flow in the engine compartment. Noise abatement measures can also contribute to this situation. For example, plastic bottom plates designed to reduce the emission of noise from the engine compartment to the roadway, under certain circumstances can produce effective insulation with which heat is enclosed in the engine compartment. Catalytic converters, due to their phased high surface temperature, are considered to be among the heat sources necessitating the use of protective shield barriers. One typical example of this situation is construction measures, such as positioning the catalytic converter close by on the manifold. This design principle performs the function of rapid heat-up of the catalytic converter, and thus, of reducing emissions in the cold start phase, and shifts a major source of heat into the engine compartment where numerous assemblies are crowded in a tight space. Certainly one reason for the growing importance of shielding components, such as heat shields, is the trend toward use of thermoplastics. The light and economical materials with their exceptional moldability are rapidly becoming common in the engine compartment, but require special attention with respect to ambient temperatures at the application site relative to other thermal engine parts ("New materials and development tools for heat protection", in MTZ 12/2001, Vol. 72, pp. 1044 ff).

DE 102 47 641 B3 discloses a generic structural component, especially in the form of a noise-damping shielding component, as a component of a motor vehicle. To improve acoustic insulation in the known structural component, the pertinent shielding component has a shielding body with a base edge as a structural part of a first type which can be fixed on the edge side by angular bracket legs within the engine compartment on stationary parts there, and which shields thermal engine components relative to heat-sensitive components.

The shielding body, as a structural part of the first type, is configured overall, viewed in cross section, as an angle, and has a symmetrical structure in this respect. The angled middle area undergoes transition on the edge side into areas of greater curvature that join bridge-like terminations extending in a straight line. On the respective two opposing edge areas, the angular brackets are mounted subsequently as fixing means. In the known solution, the shielding body has two layers of sheet metal, between which an acoustically insulating and/or heat insulating layer extends. To fix the sheet metal cover layers to one another, flanging is used in which the free flange edge of one cover layer superficially encompasses the edge area of the other cover layer. To reduce weight, the shielding body is made of aluminum or some other lightweight metal.

The known solution is used preferably for shielding a clutch between the gearbox flange and the universal shaft against solid-borne noise originating from the transmission and against the continuing influence of temperature radiation of the exhaust pipe extending adjacent to it. In tests, a reduction of acoustic emission in the known solution by 3 dB was achieved. To achieve the pertinent shielding action, along the middle area of the first structural part in the form of a shielding body, other structural parts of a second type extend in the form of bead-shaped longitudinal and transverse ribs over the outer side of the shielding body. It is characteristic of this known structuring that the longitudinal ribs extending over the entire length of the shielding body and positioned in the longitudinal orientation of the structural part of the first type are adjoined by transverse ribs which are integrally molded on, which form a type of nub structure and which in an alternating sequence fit adjacently into the intermediate spaces between the two respective transverse ribs of an adjacent longitudinal rib. The edge areas which are bent off more dramatically to the outside with the connecting brackets are conversely kept free of the ribs. With regard to the interrupted transverse rib structure of the known solution, it can be expected that in this respect stiffness and strength are reduced. Furthermore, at the transition point to the connecting brackets, stiffening of the shielding body is obtained only by the bent bracket legs which largely define the connection geometry, in this instance of the structural component, on the stationary engine or chassis components. In this way, the possible applications of the known structural component are limited. The connecting brackets with their bent bracket legs and eye connecting points for the penetration of a fastener (screw) require installation space and increase the weight for the known solution.

SUMMARY OF THE INVENTION

An object of the present invention is to provide an improved structural component ensuring very good acoustic and heat insulation, requiring less installation space and being usable in a more versatile manner, with a simultaneously increased stiffness and strength, with reduced weight and with production costs which can be comparably specified.

This object is basically achieved with a structural component with structural parts of first and second types. The structural part of the first type is designed as a shell. The structural parts of the second type are grouped into pairs, and extend transversely to the longitudinal orientation of the structural part of the first type. The edge area definitely is strengthened by an additional structural part which is an integral component of the shielding body, and need not, as shown in the prior art, have mounting-bracket parts positioned on the edge side. By transfer of the structural part of the second type in the direction of the respective edge area transversely to the longitudinal orientation of the structural part of the first type, the structural parts, which are preferably configured as bead-shaped stiffening ribs, are routed continuously to the edge area and, in this way, stiffen the edge structure of the shielding body in the form of the first structural part. In this respect, the structural component is designed as a half-shell with an essentially uniform curvature. Consequently, it takes up little installation space and is accordingly especially well suited to be used for shielding of a catalytic converter or parts thereof. The half-shell shaped configuration yields secure chambering favorable not only with respect to heat engineering, but also with respect to the desired effective acoustic insulation.

Due to the structural parts of the second type paired into groups, the shielding body makes do with few stiffening elements. This pairing helps reduce production costs. Since few transition points are created between the structural parts of different type, fewer possible failure points are also formed. This arrangement has a beneficial effect on the service life of the structural component as made according to the present invention. By the different structural parts preferably connected integrally to one another, the overall structural component can be stiffened such that a type of shielding armor is accomplished with natural vibration behavior which can be termed noncritical. The structural component solution according to the present invention is efficiently used, especially where the major occurrence of vibrations can be expected in operation.

In one preferred embodiment of the structural component according to the present invention, there are two groups with two structural parts of the second type each. The two groups in the longitudinal orientation of the structural part of the first type spaced away from one another are located in the end areas thereof. Preferably, on the saddle of the half-shell in the longitudinal orientation of the structural part of the first type, one structural part of the fourth type extends on the end side, the structural part of the fourth part is joined or adjoined by the structural parts of the second type. In this way, the torsional stiffness of the half-shell is increased with little effort, especially in the longitudinal orientation of the structural part of the first type. Cyclic bending stresses can be reliably accommodated by the structure in this way.

To additionally increase the strength, one free end of the structural part of the fourth type in the area of the respective structural part of the third type joins the structural part of the fifth type. Since the structural parts of the third type are formed from wing-like widening pieces, preferably used to fix the shielding body on the engine or chassis parts, additional stiffening benefiting the service life of the shielding body in operation is achieved by the structural part of the fifth type, preferably in the form of a reinforced transverse rib.

Distinct strengthening and stiffening are achieved in all orientations of the shielding body by the resulting structure of the different structural parts formed preferably of bead-shaped longitudinal and transverse ribs. This effect can be further enhanced by providing for the structural parts of the second type to integrally join the structural parts of the fourth type. In this way, a structural part of one type then supports stiffening by structural parts of the other types in "flowing transitions".

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings, not drawn to scale, which form a part of this disclosure.

DETAILED DESCRIPTION OF THE INVENTION

Figure 1:
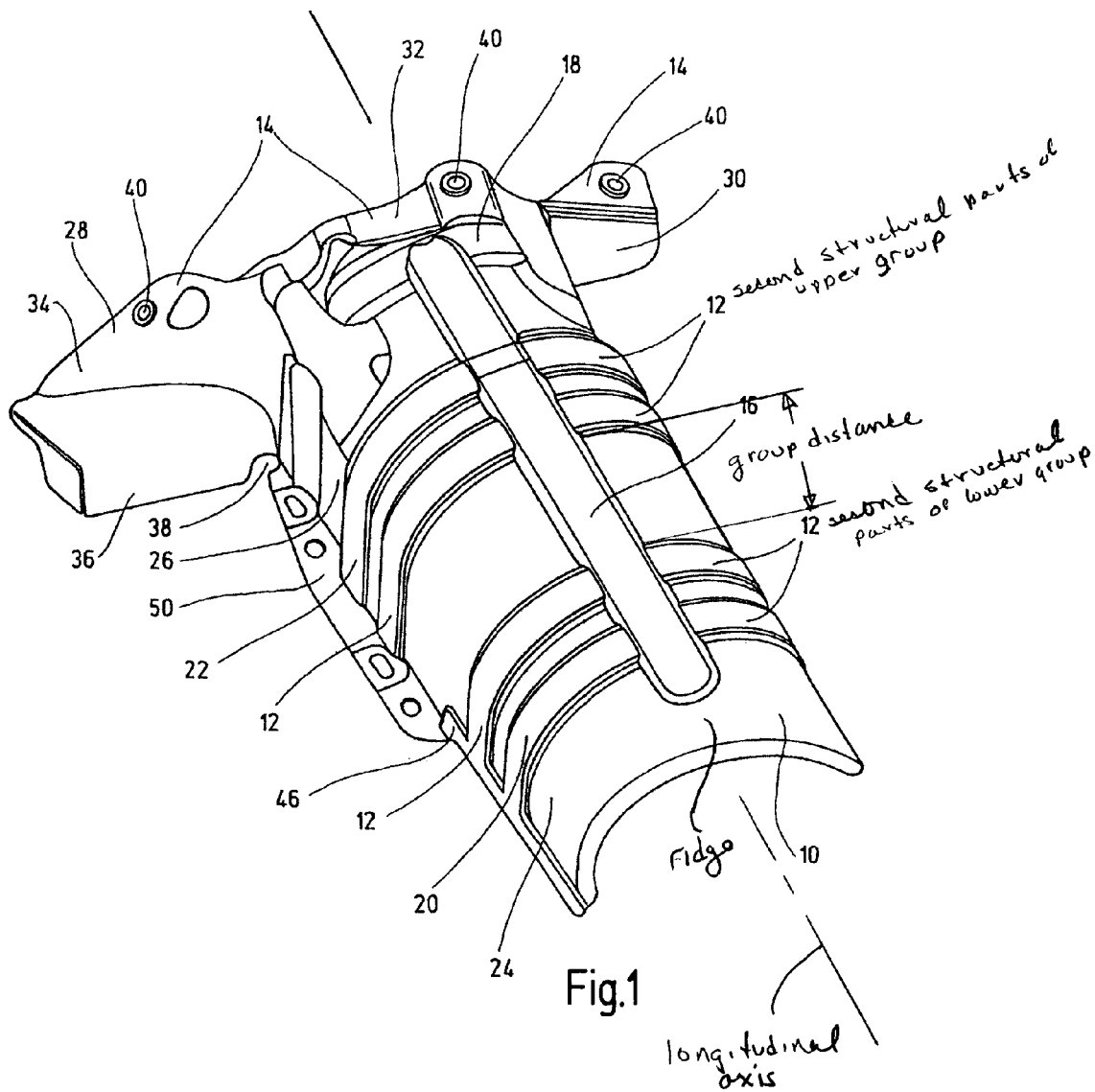
FIG. 1 is a perspective plan view of the structural component as a whole according to an exemplary embodiment of the present invention.

An exemplary embodiment of the present invention relates to a structural component, especially a shielding component, for use in motor vehicles with structural parts 10, 12, 14, 16, 18 of different types. The structural parts are at least in part differently configured with respect to their surface extent and/or the directional pattern. At least one structural part 10 of a first type is formed as a half-shell with an essentially uniform curvature. Structural parts 12 of a second type are paired into groups 20, 22, and extend transversely to the longitudinal orientation of the structural part of the first type 10.

Two groups 20, 22 are provided with four structural parts 12 of the second type each. The two groups 20, 22, in the longitudinal orientation of the structural part 10 of the first type, are spaced apart from one another and are located in the end areas 24, 26 thereof. Consequently, the two end areas 24, 26 of the structural part 10 of the first type are formed directly by parts of the half-shell. Viewed in the direction of FIG. 1, the upper end area 26 adjoins three wing-like widening pieces 28, 30 and 32 as additional structural parts or wing-shaped extension piece 14 of the third type connected transversely to the longitudinal orientation of the structural part 10 of the first type.

Figure 2:
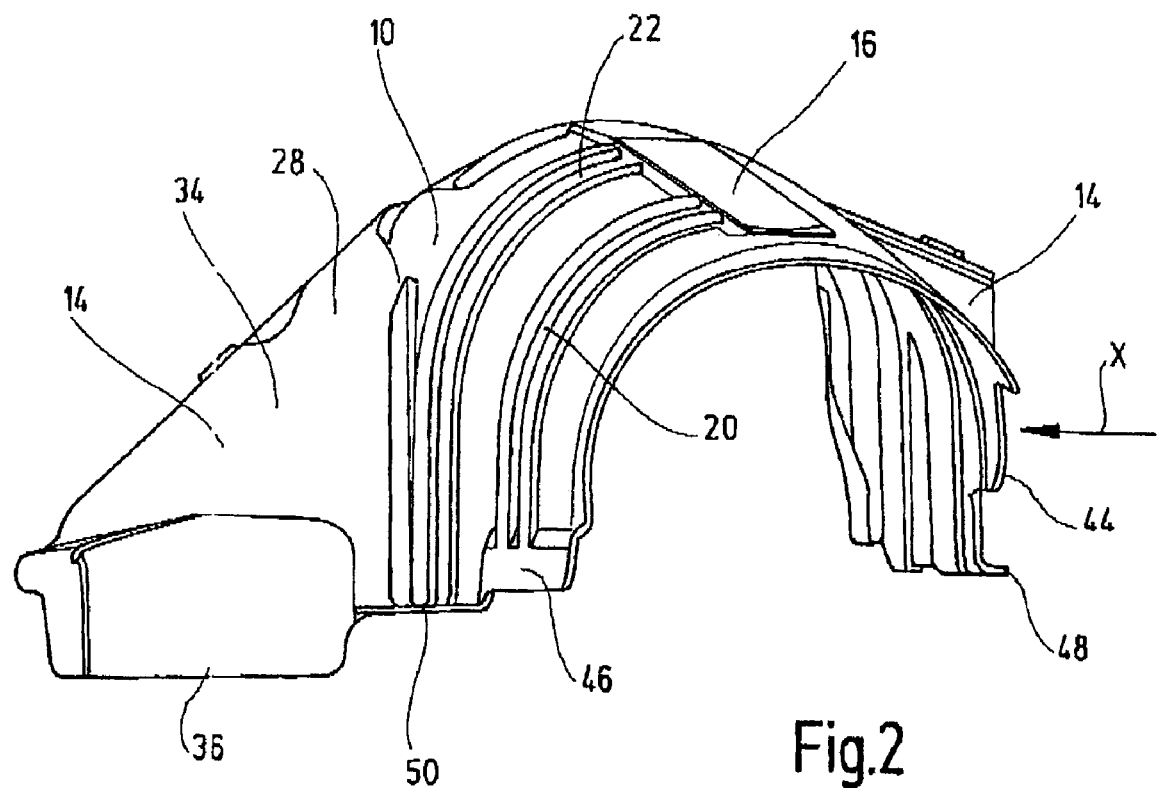
FIG. 2 is a perspective front view of the structural component shown in FIG. 1.

The widening piece 28, shown in particular in FIGS. 1 and 2, in the radial direction adjoins the end area 26 of the half-shell, and consists essentially of a triangular connecting part 34 and an underlying rectangular support part 36. Support part 36 undergoes transition by a semicircular recess 38 into the outside jacket of the edge area of the half-shell. The other opposing flat widening piece 30 is configured to be smaller with respect to geometrical dimensions, and likewise, adjoins the end area 26 of the half-shell in the manner of a wing. The third widening piece 32, in a continuation of the axial longitudinal orientation of the half-shell, forms the latter up to its end. Besides additional stiffening on the top end of the half-shell, the respective widening pieces 28, 30, 32 are also used for passage of a fastener, for example, in the form of a screw extending through the pertinent recesses 40 in the widening pieces 28, 30, 32 for fixing the structural component on engine or chassis components (not detailed). These recesses 40 are preferably formed by fixing sleeves 42 (see FIG. 3) which can be designed as additional damping elements.

On the saddle of the half-shell in the longitudinal orientation of the structural part 10 of the first type, an elongated structural part 16 or a structural part 16 of a fourth type extends. On the end side, the eight structural parts 12 of the second type join this structural part or adjoin it on the edge side. The axial distance in the longitudinal orientation of the structural part 10 of the first type between adjacent structural parts 12 of the second type of the group 20 or 22 is significantly smaller than the axial distance between the groups 20, 22 from one another, and is less than the width of one structural part 12 of the second type viewed in the longitudinal orientation of the shielding body. Depending on the application, with low tool production costs especially the distance between the groups 20, 22 can be changed in order in this way with the same basic structure of the shielding body to be able to cover a plurality of possible applications. In addition, more than two groups (not shown) can be located in the longitudinal orientation of the shielding body, as shown, on the half-shell.

As is to be seen especially from FIG. 1, one free end of the structural part 16 of the fourth type is routed in or extends into the area of the wing-shaped extension piece or structural part 14 of the third type to join the structural part 18 of the fifth type. Structural part 18 extends transversely to the longitudinal orientation of the structural part 10 of the first type, and on its top partially follows the half-shell shape in the top saddle area. The other free end of the structural part 16 of the fourth type is conversely located at a definable axial distance from the free end of the half-shell. Consequently, the structural part 16 of the fourth type extends in the manner of ribs along the saddle of the half-shell essentially over its entire length, and in this way, particularly increases its buckling stability along with contributing to increasing the torsional stiffness in conjunction with the structural parts 12 of the second type. Furthermore, the transverse extension of the structural part 16 of the fourth type is chosen to be distinctly greater than the transverse extension of the structural part 12 of the second type viewed in the longitudinal orientation.

Figure 3:
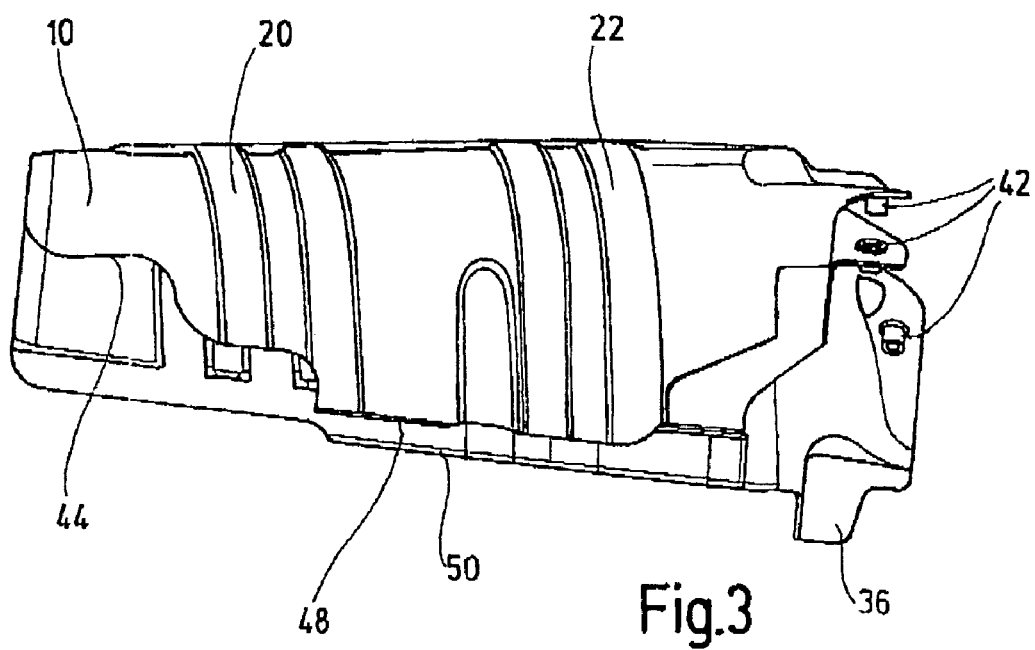
FIG. 3 is a side elevational view of the structural component, viewed in the direction of the arrow X shown in FIG. 2.

As seen from FIG. 3, at least one free side area of the half-shell has a multiple gradation 44. The gradation is set back by two partial steps in the direction of the free end of the half-shell. The transitions of the multiple gradation 44 within the gradation and to the edge areas of the half-shell on its free end and on the side of the half-shell takes place preferably in curved gradients to help reduce possible failure points. Based on the recess, by the multiple gradation 44 it is possible to guide the half-shell-shaped shielding armor around the vehicle components. On the opposing edge area of the half-shell (cf. FIGS. 1 and 2), the free ends of the structural parts 12 of the second type there run into a bridge-like fastening 46 on the free edge area of the half-shell. Conversely, the opposing structural parts 12 of the second type associated with the first group 20 at least partially join the multiple gradation 44 as well as the protruding mounting bridge 48 which finds its counterpart on the opposing side of the half-shell in another mounting bridge 50. The respective mounting bridges 48, 50 likewise perform the function of fixing the shielding component on vehicle or chassis parts (not shown).

Each structural part 10, 12, 14, 16, 18 may be multi-layered in structure, especially configured from two sheet metal cover layers. Between the two sheet metal cover layers, an acoustic and/or heat insulating intermediate layer (not detailed) is able to extend. Since this structure is conventional for structural parts, it will not be detailed here. If increased corrosion protection is to be ensured, the cover layers can preferably be formed from a high-quality steel material. Furthermore, the structural component is configured as a formed part, the structural parts 12, 16 and 18 connected preferably integrally to one another, and depending on the type, forming bead-shaped longitudinal and transverse ribs which are integral components of the convex structural part 10 of the first type and in this respect are located on its top.

While one embodiment has been chosen to illustrate the invention, it will be understood by those skilled in the art that various changes and modifications can be made therein without departing from the scope of the invention as defined in the appended claims.

What is claimed is:

1. A shielding component, comprising:
a first structural part in the form of a half-shell having a substantially uniform curvature, extending along a longitudinal axis and having a ridge extending along said longitudinal axis;
second structural parts at least in part following said curvature, being paired in groups and extending transversely to said longitudinal axis, each of said groups having four of said second structural parts, said groups being directly adjacent one another and being spaced from one another along said longitudinal axis by a group distance, said second structural parts in each of said groups having widths along said longitudinal axis and being spaced along said longitudinal axis from one another by part distances that are less than each of said widths and said group distance, said second structural parts of each of said groups being located in opposing pairs on opposite longitudinal sides of said first structural part; and
an elongated structural part extending along said longitudinal axis on said ridge, said second structural parts ending on said elongated structural part.

2. A shielding component according to claim 1 wherein at least two of said groups are located in end areas of said first structural part.

3. A shielding component according to claim 2 wherein at least one wing-shaped expansion piece extends from one of said end areas transverse to said longitudinal axis.

4. A shielding component according to claim 3 wherein said extension piece has fastening fittings thereon.

5. A shielding component according to claim 3 wherein said elongated structural part is coupled at an end thereof to a fifth structural part adjacent said expansion piece at a free end thereof, said fifth structural part extending transversely to said longitudinal axis and has a free end located at a distance from a free end of said first structural part.

6. A shielding component according to claim 5 wherein only said elongated structural part extends along said longitudinal axis on said half-shell.

7. A shielding component according to claim 1 wherein said half-shell has at least one free side area with a multiple gradation set back in a direction of a free end of said half-shell.

8. A shielding component according to claim 1 wherein said structural parts are deformed portions of a single piece.

9. A shielding component according to claim 1 wherein said second structural parts and said elongated structural part are embossments in said first structural part with said second structural parts forming transverse ribs on said first structural part.

10. A shielding component according to claim 1 wherein said structural parts are integrally connected to one another.

11. A shielding component according to claim 1 wherein said second structural parts and said elongated structural part are embossed from said first structural part to form transverse ribs and a longitudinal rib, respectively.

* * * * *